No. 857,936. PATENTED JUNE 25, 1907.
E. W. HARMON.
COMBINED DUMPING PLATFORM AND ELEVATOR.
APPLICATION FILED JULY 2, 1906.
2 SHEETS—SHEET 1.
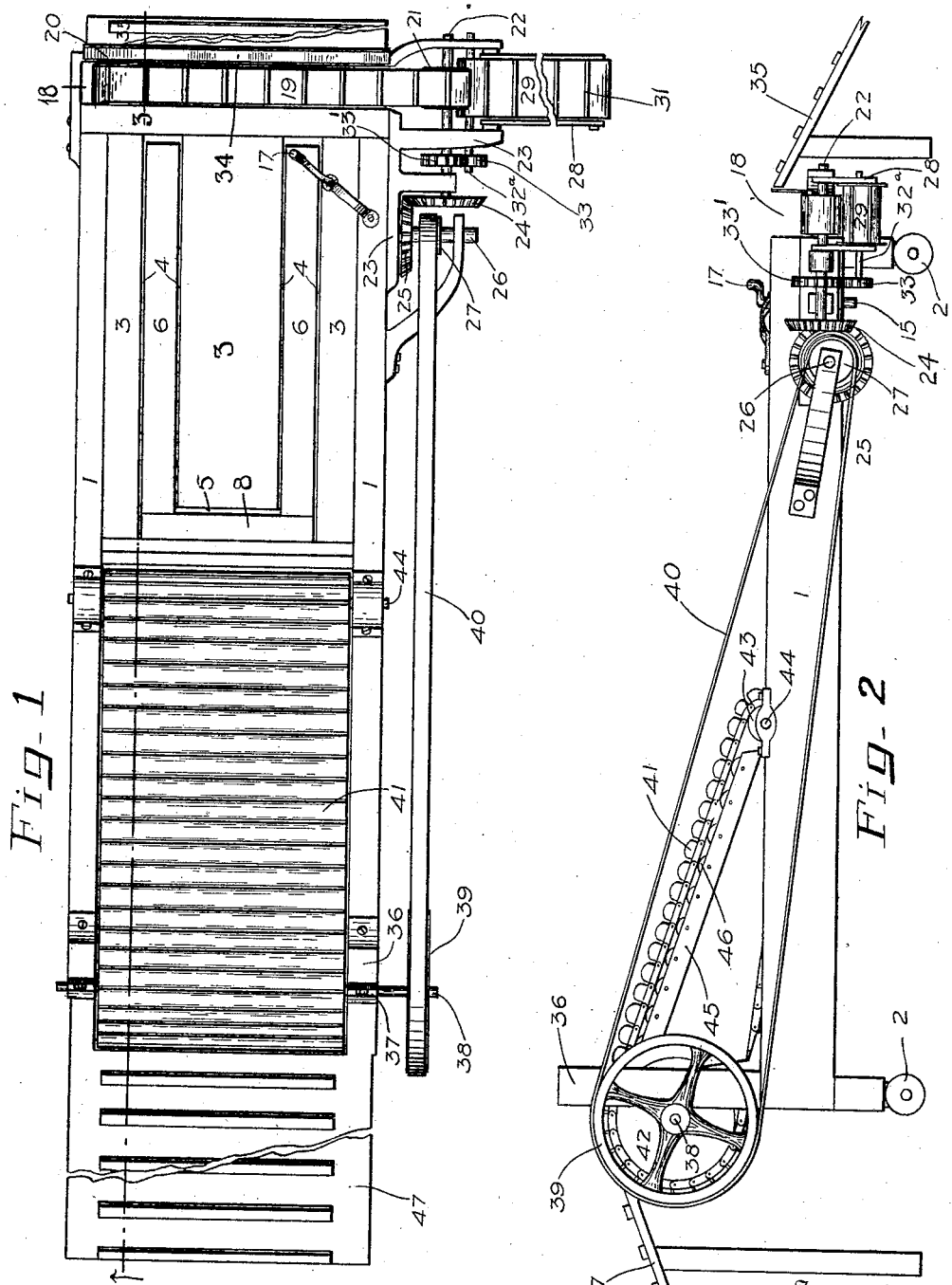
Witnesses
Charles Parker.
C. H. Griesbauer
Inventor
E. W. Harmon.
by H. B. Willson & Co.
Attorneys No. 857,936. PATENTED JUNE 25, 1907.
E. W. HARMON.
COMBINED DUMPING PLATFORM AND ELEVATOR.
APPLICATION FILED JULY 2, 1906.
2 SHEETS—SHEET 2.
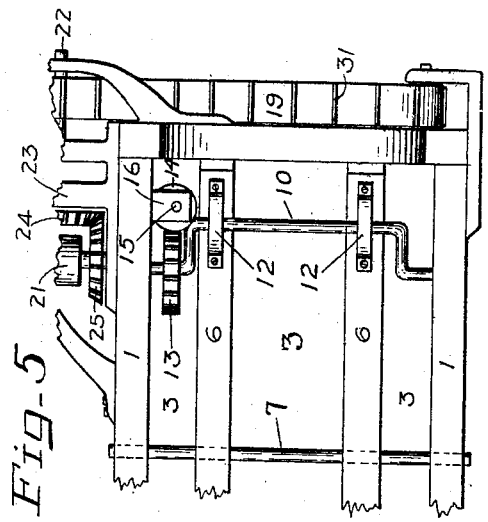
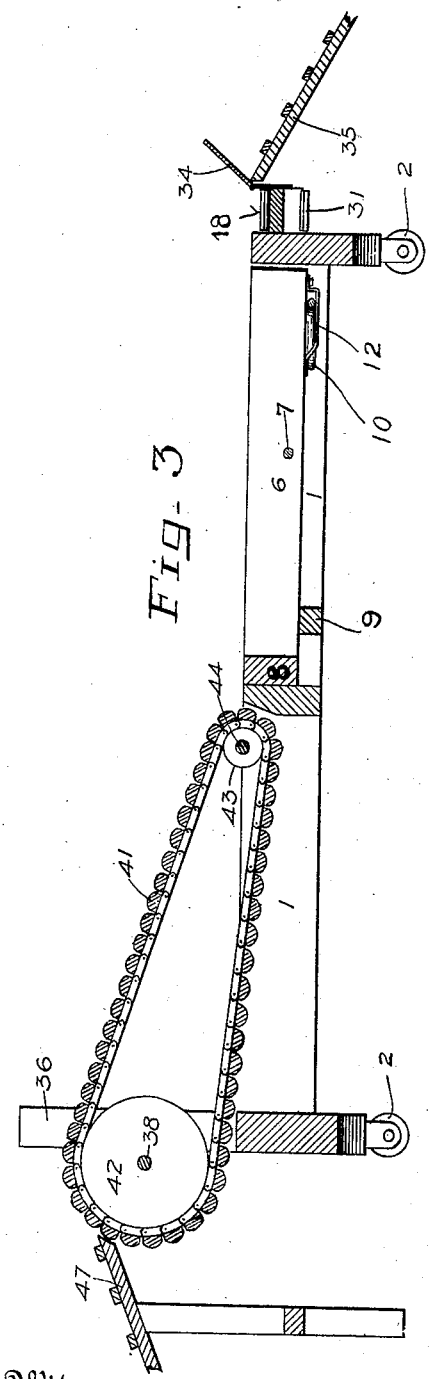
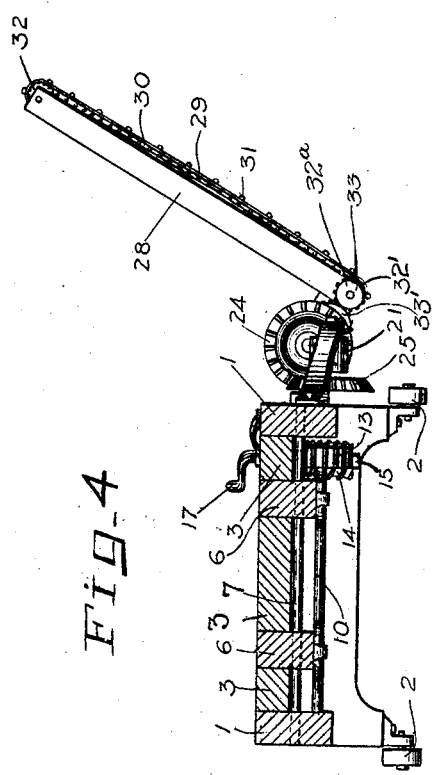
Witnesses
Charles Parker.
C. H. Griesbauer.
Inventor
E. W. Harmon.
by H. B. Willson &co
Attorneys

UNITED STATES PATENT OFFICE.

EDWARD W. HARMON, OF KANSAS, ILLINOIS, ASSIGNOR OF ONE-THIRD TO WM. C. PINNELL, OF KANSAS, ILLINOIS.

COMBINED DUMPING PLATFORM AND ELEVATOR.

No. 857,936.  Specification of Letters Patent.  Patented June 25, 1907.

Application filed July 2, 1906. Serial No. 324,486.

*To all whom it may concern:*

Be it known that I, EDWARD W. HARMON, a citizen of the United States, residing at Kansas, in the county of Edgar and State of Illinois, have invented certain new and useful Improvements in Combined Dumping Platforms and Elevators; and I do declare the following to be a full, clear, and exact description of the invention, such as will enable others skilled in the art to which it appertains to make and use the same.

This invention relates to improvements in combined dumping platforms and elevators.

The object of the invention is to provide a device of this character upon which a team may be driven and a wagon dumped of its contents and said contents elevated to the desired place of delivery without unhitching the team.

With the above and other objects in view, the invention consists of certain novel features of construction, combination and arrangement of parts, as will be hereinafter described and claimed.

In the accompanying drawings:—Figure 1 is a top plan view of the combined dumping platform and elevator constructed in accordance with my invention; Fig. 2 is a side view of the same; Fig. 3 is a vertical longitudinal sectional view, taken on the lines 3—3, Fig. 1; Fig. 4 is a vertical transverse sectional view; and Fig. 5 is an inverted plan view of a portion of the apparatus.

Referring more particularly to the drawings, 1 denotes the main frame of the machine, which is preferably provided with supporting wheels 2 by means of which the same may be readily transported from one place to another. In the forward end of the machine is arranged a platform 3, in which is formed longitudinally-disposed slots or passages 4 which communicate at their rear ends with a transverse passage 5. In the passages 4 and 5 are pivotally mounted dumping bars or beams 6, said beams being pivotally mounted upon a transversely-disposed shaft 7, the ends of which are secured in the longitudinal side bars of the frame 1. The rear ends of the dumping beams 6 are connected by a cross bar 8 disposed in the cross passage 5. The connected ends of the dumping beams 6 are supported upon a cross bar 9 arranged in the frame 1. The forward ends of the beams 6 are supported upon a crank shaft 10, and are loosely connected thereto by means of straps 12, whereby when the crank shaft is rocked, the forward ends of the beams will be tilted downwardly in the passages 4 of the platform. Mounted on the crank shaft 10 is a worm gear 13, which is adapted to be engaged by a worm 14 on a vertically-disposed shaft 15 journaled in suitable bearing brackets on one of the side bars of the frame 1 beneath the platform 3. The shaft 15 projects upwardly through the platform 3, and is mounted in a bearing bracket 16. The upper end of the shaft is provided with a crank handle 17, by means of which the same may be turned thereby engaging the worm 14 thereon with the worm gear 13, which when thus operated, will rock the crank shaft 10 and cause the latter to tilt the forward ends of the dumping beams 6 downwardly.

Arranged across the forward end of the platform 3 is a trough 18, in which is mounted an endless conveyer 19. One end of the conveyer 19 passes around an idle roller 20, while the opposite end passes around a drive pulley or roller 21 mounted on a drive shaft 22 journaled in suitable brackets 23 on the side of the frame 1, as shown. On the inner end of the shaft 22 is a beveled gear wheel 24, which is adapted to mesh with a similar gear 25 mounted on a stub shaft 26 journaled in the bracket 23, said shaft being also provided with a drive pulley 27.

Hingedly mounted on the bracket 23 in line with the conveyer 19 is an elevator frame 28, in which is mounted an endless, slatted conveyer or elevator belt 29, comprising an endless sprocket chain 30, connected at suitable intervals by slats 31. The chains 30 pass around sprocket gears 32, mounted on a cross shaft in the outer end of the elevator frame. The chains 30 also pass around sprocket wheels 32' mounted on a drive shaft 32ª, journaled in the lower end of the elevator. The shaft 32ª is provided with a gear wheel 33, which is adapted to engage and mesh with a similar gear wheel 33' on the shaft 22, whereby motion is imparted to the elevator belt through the conveyer driving mechanism.

The conveyer trough 18 is provided with a hinged cover plate 34 and connected to said trough is an inclined platform 35, by means of which a team may be readily driven up onto the platform.

On the rear ends of the side bars of the main frame are secured upright bearing standards 36. On the standards 36 are arranged bearings 37, in which is journaled a tread power shaft 38. On one end of the shaft 38 is mounted a drive pulley 39, which is connected to the pulley 27 on the stub shaft 26 by a belt 40, thereby imparting motion to the elevator and conveyer mechanism on the forward end of the machine.

Arranged on the tread power shaft 38 is an endless tread power belt 41, which may be of the usual or any desired construction, and is adapted to pass around supporting pulleys 42 mounted on the shaft 38 and around idle pulleys or rollers 43 mounted on a transverse shaft 44 arranged adjacent to the rear end of the platform 3 and journaled in suitable bearings on the longitudinal side bars of the frame 1, as shown. Secured to the longitudinal side bars of the frame 1 are inclined supporting bars 45, which are preferably of channel iron form, and in which are journaled a series of rollers or other anti-frictional devices 46, upon which the cross bars of the tread power belt is supported. Connected to the upper ends of the standards 36 is an inclined platform 47, down which the team may be driven after the load has been dumped from the wagon onto the endless conveyer as hereinbefore described. Adapted to be engaged with the pulley 39 is a brake 48, by means of which the same and the tread power belt may be locked against revolving.

In operation, a loaded team is driven up the forward inclined platform, and onto the main platform 3, the wheels of the wagon resting upon the dumping bars or beams 6, the draft animals being driven onto the tread power belt. The crank on the worm shaft 15 is now turned, thereby causing the worm on said shaft to engage and rotate the worm gear 13, which will rock the shaft 10, and thereby lower the forward ends of the dumping beams, thus tilting the rear end of the wagon downwardly to permit the contents therein to be discharged on the endless conveyer. The brake 48 is now released from the pulley 39, after which the draft animals of the wagon will be caused to operate the tread power belt and through the pulley 39 connected therewith to drive the mechanism of the conveyer belt and elevator, thereby conveying the material dumped onto said conveyer belts across the forward end of the machine and to deposit the same onto the lower end of the elevator by means of which it is carried upwardly and discharged whereever desired.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

A combined dumping platform and elevator comprising a main frame, a platform arranged in one end of said frame, parallel, longitudinally - disposed dumping bars arranged in said platform, a crank shaft connected to one end of said dumping bars, a worm gear on said crank shaft, a vertically-disposed worm adapted to engage said worm gear, a crank handle on the shaft of said worm, whereby the latter may be turned, thereby operating said gears and crank shaft to tilt said dumping bars, an endless conveyer arranged across the forward end of said platform, an elevator connecting with said conveyer, driving gears connected to said conveyer and elevator, a tread power arranged in the rear end of said frame, a drive pulley operated by said tread power, and a belt connecting said drive pulley to the operating gears of said conveyer and elevator, substantially as described.

In testimony whereof I have hereunto set my hand in presence of two subscribing witnesses.

EDWARD W. HARMON.

Witnesses:
  W. C. PINNELL,
  POPE WILHOIT.